(12) United States Patent
Wang et al.

(10) Patent No.: US 7,999,034 B2
(45) Date of Patent: Aug. 16, 2011

(54) BENEFIT COMPOSITIONS AND METHODS

(75) Inventors: Jiping Wang, West Chester, OH (US);
Jinlian Hu, Hong Kong (CN)

(73) Assignee: The Procter & Gamble Company,
Cincinnati, OH (US)

( * ) Notice: Subject to any disclaimer, the term of this patent is extended or adjusted under 35 U.S.C. 154(b) by 557 days.

(21) Appl. No.: 11/986,128

(22) Filed: Nov. 20, 2007

(65) Prior Publication Data

US 2008/0116415 A1 May 22, 2008

Related U.S. Application Data

(60) Provisional application No. 60/861,483, filed on Nov. 28, 2006, provisional application No. 60/860,585, filed on Nov. 22, 2006.

(51) Int. Cl.
| | |
|---|---|
| *A01N 25/34* | (2006.01) |
| *A61K 8/72* | (2006.01) |
| *A61K 9/14* | (2006.01) |
| *A61Q 5/00* | (2006.01) |
| *A61Q 5/12* | (2006.01) |
| *A61Q 7/00* | (2006.01) |
| *B32B 5/02* | (2006.01) |
| *B32B 9/04* | (2006.01) |
| *B32B 25/02* | (2006.01) |
| *B32B 25/10* | (2006.01) |
| *B32B 27/04* | (2006.01) |
| *B32B 27/12* | (2006.01) |
| *C08G 18/08* | (2006.01) |
| *C08G 18/28* | (2006.01) |
| *C08J 3/00* | (2006.01) |
| *C08K 3/20* | (2006.01) |
| *C08L 75/00* | (2006.01) |

(52) U.S. Cl. .......... 524/590; 424/70.11; 424/70.12; 424/402; 424/486; 442/96; 442/99; 442/104; 442/105; 442/115; 442/147; 442/163; 442/280; 442/281; 524/589; 524/591; 524/839; 524/840

(58) Field of Classification Search .......... 524/589, 524/590, 591, 839, 840; 442/96, 99, 105, 442/104, 115, 147, 163, 280, 281; 424/70.11, 424/70.12, 402, 486
See application file for complete search history.

(56) References Cited

U.S. PATENT DOCUMENTS

| | | | |
|---|---|---|---|
| 3,248,259 A * | 4/1966 | Borsellino et al. .......... 442/148 |
| 3,695,924 A * | 10/1972 | Wagner .......... 442/107 |
| 3,811,210 A | 5/1974 | Cashen et al. |
| 6,740,126 B2 | 5/2004 | Wang et al. |
| 2003/0150070 A1 | 8/2003 | Wang |
| 2003/0154565 A1 | 8/2003 | Wang |
| 2003/0226212 A1 | 12/2003 | Wang et al. |
| 2003/0226213 A1 | 12/2003 | Wang et al. |
| 2004/0152381 A1 | 8/2004 | York et al. |
| 2005/0107563 A1 | 5/2005 | Hu et al. |
| 2005/0246841 A1 | 11/2005 | Wang |
| 2006/0248657 A1 | 11/2006 | Wang et al. |
| 2007/0163054 A1 | 7/2007 | Wang et al. |

FOREIGN PATENT DOCUMENTS

| | | |
|---|---|---|
| EP | 0985740 A1 | 3/2000 |
| EP | 1274804 B1 | 6/2004 |
| WO | WO 00/14296 A1 | 3/2000 |
| WO | WO 00/14323 A1 | 3/2000 |

* cited by examiner

*Primary Examiner* — Patrick Niland
(74) *Attorney, Agent, or Firm* — Andrew J. Mueller; James F. McBride; Leonard W. Lewis

(57) ABSTRACT

A textile benefit composition comprising a polyurethane and/or a polyurethane co-polymer; a cross-linking agent; a catalyst; and a carrier and processes for making and using the aforementioned compositions and textiles treated with such compositions are disclosed.

13 Claims, No Drawings

BENEFIT COMPOSITIONS AND METHODS

CROSS-REFERENCES TO RELATED APPLICATIONS

This application claims priority under 35 U.S.C. §119(e) to U.S. Provisional Application Ser. No. 60/861,483 filed Nov. 28, 2006, and U.S. Provisional Application Ser. No. 60/860,585 filed Nov. 22, 2006.

FIELD OF THE INVENTION

This invention relates to benefit compositions, and processes for making and using such compositions.

BACKGROUND OF THE INVENTION

Due to use and cleaning, articles that comprise fibers, for example, garments and linens can wrinkle. In order to reduce wrinkles, such garments and linens are typically ironed or steamed after cleaning. Unfortunately the effectiveness of such treatments is not durable as wrinkles reappear during cleaning, storage and/or in use/wear.

Accordingly, there is a need for a textile benefit compositions that consumers can use to impart durable anti-wrinkle properties to finished textile products.

SUMMARY OF THE INVENTION

A textile benefit composition comprising a polyurethane and/or a polyurethane co-polymer; a cross-linking agent; and a carrier.

The present invention also relates to processes for making and using the aforementioned compositions and textiles treated with such compositions.

DETAILED DESCRIPTION OF THE INVENTION

Definitions

As used herein, the term "consumer textile products" includes, unless otherwise indicated, fibers, yarns, fabrics and/or garments or articles comprising same.

As used herein, articles, including a and an, are understood to mean one or more of what is claimed or described.

Unless otherwise noted, all component or composition levels are in reference to the active level of that component or composition, and are exclusive of impurities, for example, residual solvents or by-products, which may be present in commercially available sources.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Compositions

In one aspect, a composition, comprising from about 0.1% to about 30%, from about 0.5% to about 20% from about 1% to about 10% from about or even from about 1.5% to about 8% by weight of a polyurethane material selected from the group consisting of a polyurethane, a polyurethane copolymer and mixtures thereof, said polyurethane and polyurethane having a Tg of from about −50° C. to about 150° C., from about −30° C. to about 100° C., from about −10° C. to about 80° C., or even from about 20° C. to about 60° C.; a cross-linking agent, said crosslinking agent being present in a ratio of polyurethane to crosslinking agent of from about 100:1 to about 1:2, from about 50:1 to about 1:1, from about 20:1 to about 3:2, or even from about 10:1 to about 2:1; a catalyst, said catalyst being present in a ratio of crosslinking agent to catalyst of from about 100:1 to about 1:5, from about 50:1 to about 1:1, from about 20:1 to about 3:2, or even from about 10:1 to about 2:1; and an optional adjunct ingredient with the balance of said composition being a carrier, for example water, is disclosed.

In one aspect, a composition having the aforementioned parameters and wherein said polyurethane material comprises a material having Formula I below:

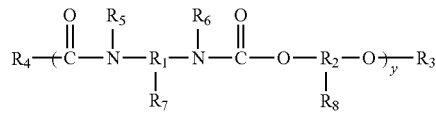

wherein:
a.) $R_1$ and $R_2$ are independently selected from an aryl, heteroaryl, alkyl or a heteroalkyl group that can be substituted or unsubstituted;
b.) $R_3$, $R_5$ and $R_6$ are independently selected from H, a polymer or an aryl, heteroaryl, alkyl or a heteroalkyl group;
c.) $R_4$ is OH, a polymer or an aryl, heteroaryl, alkyl or a heteroalkyl group ; and
d.) $R_7$ and $R_8$ are independently selected from H, an aryl, heteroaryl, or alkyl group that can be substituted or unsubstituted
e.) y is an integer from 1-200, 1-100, 1-50, 1-20, 1-10, or 1-5 is disclosed.

In one aspect, a composition having the aforementioned parameters and wherein said polyurethane material comprises a material having Formula I above wherein:
a.) $R_1$ is selected from 4,4'-diphenylmethane, benzene, carbodiimide-modified 4,4'-diphenylmethane, and hexamethylene
b.) $R_2$ is selected from polypropylene glycol, polyethylene glycol, 1,4-butane glycol adipate, 1,4-butane, 1,3-propane, ethane, 4,4'-dihydroxy biphenyl, and 2,2'-dimethylolpropanic acid;
c.) $R_3$, $R_4$, $R_5$ and $R_6$ are independently selected from silicones, polyethylene, polypropylene, functionalized substituted waxes, fatty esters, polyamines, polyacrylates, carboxylic acids, and polycarboxylic acids; and
d.) $R_7$ and $R_8$ are independently selected from an aryl, heteroaryl, or alkyl group that can be substituted or unsubstituted
is disclosed.

In any of the aspects of the compositions that are disclosed in the present specification, said cross-linking agent may comprise a material selected from the group consisting of methylol and alkoxymethyl derivatives of urea and of ethylene and propylene urea, multifunctional carboxylic acids and mixtures thereof.

In any of the aspects of the compositions that are disclosed in the present specification, said compositions may a comprise a lubricant. Said lubricant may comprise a material selected from the group consisting of a fatty ester, a silicone, a polyethylene emulsion and mixtures thereof.

In any of the aspects of the compositions that are disclosed in the present specification, said compositions may comprise an optional adjunct ingredient that comprises a material selected from the group consisting of a perfume, perfume delivery system, wetting agent, softening agent, hair conditioning agent, skin care agent, stain repellant, soil release agent, antistatic agent, moisture management agent, dye fixative, dye transfer inhibitor, color enhancer, substrate hand builder, anti-abrasion agent and mixtures thereof. In one aspect, said optional ingredients may comprise, based on total composition weight, from about 0.001% to about 30%, from about 0.01% to about 20% or even from about 0.05% to about 10% of said composition.

In any of the aspects of the compositions that are disclosed in the present specification, said catalyst may comprise a material selected from the group consisting of acids, latent acids, metal salts and mixtures thereof.

Materials

Suitable polyurethane and polyurethane copolymer may be by following the teachings of the present specification and U.S. Patent Application No. 2005/0107563 A1.

Suitable cross-linking agents may be obtained from Sigma-Aldrich of St. Louis, Mo. U.S.A., and Noveon, Inc. of Cleveland, Ohio U.S.A.

Suitable catalysts may be obtained from Sigma-Aldrich of St. Louis, Mo. U.S.A.

Suitable lubricants may be obtained from Akzo Nobel of Velperweg 76, 6824 BM Arnhem The Netherlands, and The Dow Corning Corporation of Midland, Mich. U.S.A.

Suitable optional adjunct ingredients may be obtained from International Flavors & Fragrances of New York, N.Y. U.S.A., BASF Aktiengesellschaft of Ludwigshafen, Germany, Ciba Specialty Chemicals Inc., of Basel, Switzerland, and Clariant International Ltd, of Muttenz, Switzerland.

Process of Making Compositions

Compositions disclosed in the present specification may be made by combining the materials, as disclosed in the present specification, in the amounts disclosed in the present specification. Such combining may be achieved by any combining process included batch, semi-batch and continuous processes.

Product

In one aspect, a finished consumer product comprising packaging and any of the compositions disclosed in the present specification is disclosed. In one aspect, said finished consumer product may comprise a container containing, at least in part, any of the compositions disclosed in the present specification.

Treatment Method

In one aspect, a method of treating a consumer textile product, hair or combination thereof that may comprise the steps of:
a.) contacting at least a portion of said consumer textile product, hair or combination thereof with any of the compositions disclosed in the present specification;
b.) drying at least a portion of said consumer textile product, hair or combination thereof that was in contact with any of the compositions disclosed in the present specification is disclosed.

In one aspect, said drying may be achieved by ironing and/or pressing consumer textile product.

In one aspect, said contact is achieved by spraying or soaking said consumer textile product with any of the compositions disclosed in the present specification.

In one aspect, said consumer textile product, hair or combination thereof is treated prior to said textile product being used by end user.

Treated Product

In one aspect, a treated product, produced by treating said product treated according to the treatment methods disclosed in the present specification, is disclosed.

EXAMPLES

Examples of the Spray-Iron Product Compositions

|  | Example 1 | Example 2 | Example 3 |
|---|---|---|---|
| Polyurethane (%) | 4.0 | 5.0 | 2.5 |
| Tg of Polyurethane (° C.) | 55 | 45 | 35 |
| Polyurethane copolymer (%) | 1.5 | 2.0 | 2.0 |
| Silicone (%) | 1.0 | 0.0 | 0.0 |
| Polyethylene Wax (%) | 0.0 | 1.0 | 0.0 |
| Dihydroxymethyl-4,5-dihydroxyethyleneurea, modified | 1.0 | 0.0 | 0.0 |
| $MgCl_2$ | 0.2 | 0.0 | 0.0 |
| Butanetetracarboxylic acid | 0.0 | 1.0 | 0.0 |
| Polymalic Acid | 0.0 | 0.0 | 1.0 |
| Sodium hypophosphite | 0.0 | 0.3 | 0.4 |
| Silicone polyols | 0.2 | 0.2 | 0.1 |
| Perfume | 0.1 | 0.15 | 0.1 |
| Water | Balance | Balance | Balance |

Example 4

Spray-Iron Application:

A fabric comprising 100% cotton fibers is placed on an ironing board and the composition of Example 1 is evenly sprayed on the fabric in a sufficient amount to achieve a wet pick up at about 50%. The fabric is then ironed until it is dry using a high temperature setting.

Example 5

Soak-Iron Application:

About 200 g of the composition of Example 2 is combined with 1000 g of water. The resulting mixture is stirred and/or agitated. The garments, which include a shirt comprising 100% cotton fibers are placed in a container containing such mixture and agitated for about 5 minutes. The garments are then spun in a washer for 2 minutes and then ironed until it is dry.

Example 6

Soak-Iron Application:

About 200 g of the composition of Example 2 is combined with 1000 g of water. The resulting mixture is stirred and/or agitated. The garments, which include a shirt comprising 50% cotton fibers and 50% polyester fibers are placed in a container containing such mixture and agitated for about 5 minutes. The garments are then spun in a washer for 2 minutes and then ironed until it is dry.

| Chemical | Weight % |
| --- | --- |
| Polyurethane | 6.5 |
| Dimethyl Dihydroxy ethylene urea | 2.0 |
| Polyethylene glycol | 0.5 |
| MgCl2 | 0.5 |
| Methanol | 0.3 |
| Optional Perfume and/or dye* | |
| Water | Balance to 100% |
| Polyurethane | 6.5 |
| DMDHEU* | 2.0 |
| Diethylene glycol | 1.5 |
| Polyethylene glycol | 0.5 |
| MgCl2 | 0.5 |
| Methanol | 0.3 |
| Optional Perfume and/or dye** | |
| Water | 88.7 |

Dimethyloldihydroxyethylene urea

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

All documents cited in the Detailed Description of the Invention are, in relevant part, incorporated herein by reference; the citation of any document is not to be construed as an admission that is prior art with respect to the present invention. To the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modification can be made without departing from the spirit and scope of the invention. It is therefore intended to cover in the appended claims all such changes and modifications that are within the scope of this invention.

What is claimed is:

1. A composition comprising:
    (a) from about 0.1% to about 30%, by weight of the total composition, of a polyurethane material having a Tg of from about −50° C. to about 150° C., said polyurethane material comprising a material having Formula I below:

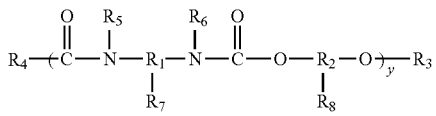

wherein:
   y is 1-200
   $R_1$ is selected from 4,4'-diphenylmethane, benzene, carbodiimide-modified 4,4'-diphenylmethane, and hexamethylene;
   $R_2$ is selected from the moiety resulting from removing the hydroxyl groups from polypropylene glycol, the moiety resulting from removing the hydroxyl groups from polyethylene glycol, the moiety resulting from removing the hydroxyl groups from 1,4-butane glycol adipate, 1,4-butane, 1,3-propane, ethane, the moiety resulting from removing the hydroxyl groups from 4,4'-dihydroxy biphenyl, and the moiety resulting from removing the hydroxyl groups from 2,2'-dimethylolpropanic acid;
   $R_3$, $R_4$, $R_5$ and $R_6$ are independently selected from silicones, polyethylene, polypropylene, fatty esters, polyamines, polyacrylates, carboxylic acids, and polycarboxylic acids; and
   $R_7$ and $R_8$ are independently selected from aryl, heteroaryl, or alkyl groups;
    (b) a cross-linking agent, said crosslinking agent being present in a ratio of polyurethane to crosslinking agent of from about 100:1 to about 1:2, said ratio of polyurethane to crosslinking agent calculated by weight; and
    (c) a catalyst, said catalyst being present in a ratio of crosslinking agent to catalyst of from about 100:1 to about 1:5, said ratio of crosslinking agent to catalyst calculated by weight;
    the balance of said composition being a carrier, and
    said composition being a finished consumer product.

2. A composition according to claim 1 wherein said cross-linking agent comprises a material selected from the group consisting of methylol and alkoxymethyl derivatives of urea and of ethylene and propylene urea, multifunctional carboxylic acids and mixtures thereof.

3. A composition according to claim 1 further comprising a lubricant.

4. A composition according to claim 3 wherein said lubricant comprises a material selected from the group consisting of a fatty ester, a silicone, a polyethylene emulsion and mixtures thereof.

5. A composition according to claim 1 further comprising an adjunct ingredient, wherein said adjunct ingredient comprises a material selected from the group consisting of a perfume, perfume delivery system, wetting agent, softening agent, hair conditioning agent, skin care agent, stain repellant, soil release agent, antistatic agent, moisture management agent, dye fixative, dye transfer inhibitor, color enhancer, substrate hand builder, anti-abrasion agent and mixtures thereof.

6. A composition according to claim 1 wherein said catalyst comprises a material selected from the group consisting of acids, latent acids, metal salts and mixtures thereof.

7. A product comprising a packaging and the composition of claim 1.

8. A product according to claim 7 wherein said packaging comprises a container containing, at least in part, said composition.

9. A method of treating a consumer textile product, hair or combination thereof comprising the steps of:
    a.) contacting at least a portion of said consumer textile product, hair or combination thereof with the composition of claim 1;
    b.) drying at least a portion of said consumer textile product, hair or combination thereof that was in contact with said composition of claim 1.

10. The method of claim 9 wherein said consumer textile product, hair or combination thereof is a consumer textile product and wherein said drying is achieved by ironing and/or pressing the consumer textile product.

11. The method of claim 9 wherein said consumer textile product, hair or combination thereof is a consumer textile product and wherein said contacting is achieved by spraying or soaking said consumer textile product with said composition.

12. The method of claim 9 wherein said consumer textile product, hair or combination thereof is a consumer textile product and said consumer textile product is treated prior to said consumer textile product being used by end user.

13. A textile product treated according to the method of claim 9.

* * * * *